Oct. 18, 1966     H. G. FENDLER ETAL     3,280,330
SHIELDING ARRANGEMENT FOR NUCLEAR REACTORS
Filed Nov. 22, 1960
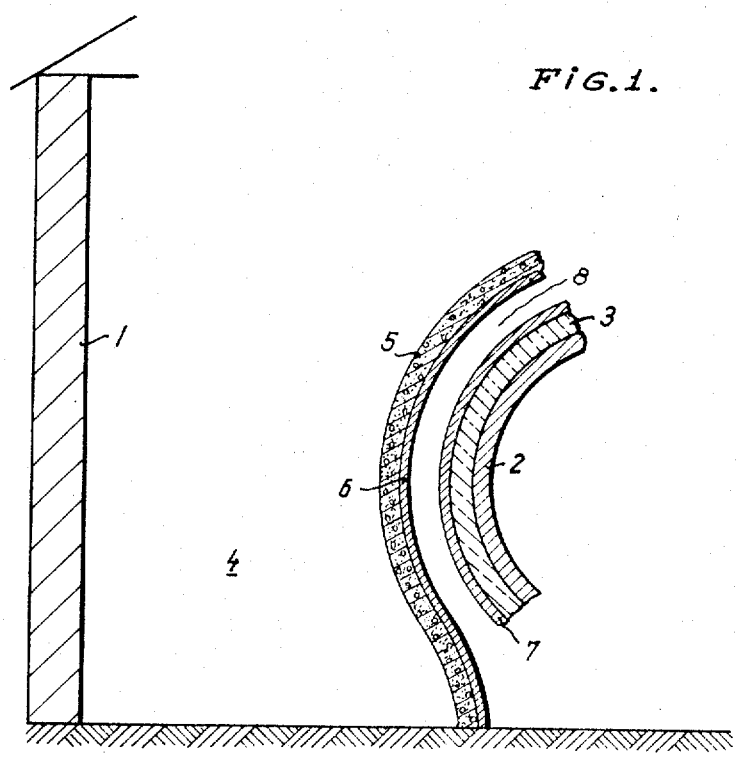
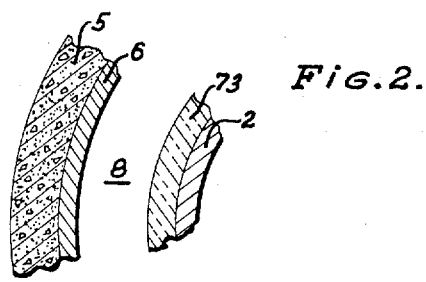
Inventors
H. GERHARD FENDLER
WILHELM RINGEIS
By Toulmin & Toulmin
Attorneys 3,280,330
SHIELDING ARRANGEMENT FOR NUCLEAR REACTORS
Heinz Gerhard Fendler, Schwalbach, Taunus, and Wilhelm Ringeis, Frankfurt am Main, Germany, assignors to Licentia Patent-Verwaltungs-G.m.b.H., Frankfurt am Main, Germany
Filed Nov. 22, 1960, Ser. No. 70,962
Claims priority, application Germany, Nov. 24, 1959, L 34,774
6 Claims. (Cl. 250—108)

The present invention is related to shielding arrangements for nuclear reactors, particularly for reactors having a space between the reactor container and the biological shield for the entire reactor body. This space usually is necessary to balance any difference in the thermal expansion characteristics of the biological shielding and the reactor container.

Usually a nuclear reactor is positioned inside of a special building which building, of course, should be accessible for service personnel during operation of the reactor. Consequently, the space between the mentioned reactor container and the biological shielding around the entire reactor body has to be kept at a pressure well below the atmospheric pressure in order to avoid migration of any activated gas of the said space into the area to which the service men have access.

The gas still within the mentioned space will become radioactive by neutron radiation emanating from the reactor through the heat insulation thereof, if there is any. In case the gas in the space is simply air which usually is the case, it has been found that argon 41 is produced by this neutron radiation. This argon isotope is a radioactive one.

Usually the ventilation causing the reduction of pressure in the mentioned space serves also to cool the biological shielding and to remove some of the heat emanated from the reactor. In the reactors of this type it has been found that the radioactive argon and other components of the air made radioactive by neutrons, will finally pass through the gas removal system and thereafter through the chimney to the atmosphere. This presents a serious problem with regard to safety regulations setting forth maximum limits of radioactive components permitted to be discharged from the reactor into the atmosphere. Accordingly, considerable expenditure is necessary to remove the radioactive components from the gas or to have those components decayed before the gas is discharged through a chimney.

Furthermore, it has been found, that even in case of a low pressure in the mentioned space between the reactor container and the biological shielding, some radioactive isotopes of the various gases, particularly of air components, will gain access into the area where the service personnel usually is found. Consequently, the maximum period of time during which such personnel can be present in the reactor building becomes very limited because otherwise the maximum permissible radiation doses would be exceeded.

It is an object of the invention to substantially prevent the production of the radioactive isotopes in the low pressure area between the reactor container and the biological shielding surrounding the main reactor body.

It is another object of the invention to reduce the radioactivity in the area of the reactor building to which the service personnel has access.

It is a further object of the invention to reduce the expenditure necessary to remove or store radioactive components from the waste gas to be discharged into the atmosphere.

According to one aspect of the present invention in a preferred embodiment thereof it is suggested to provide layers or coatings of neutron absorbing material upon the inner surface of the biological shield as well as the outer surface of the reactor container.

While the specification concludes with claims particularly pointing out and distinctly claiming the subject matter which is regarded as the invention it is believed that the invention, the objects of the invention and further objects and advantages thereof will be better understood from the following description taken in connection with the accompanying drawing in which FIGURE 1 thereof illustrates a partial cross-sectional view through a reactor housing and heat exchange and pressure system thereof; and FIGURE 2 illustrates a partial cross-sectional view through a modified arrangement.

In the drawing, reference numeral 1 designates a portion of the building, particularly an outer wall thereof, housing the nuclear reactor. 2 designates the inner wall and the actual body of the reactor container through which the heat exchange medium is flowing during operation of the reactor. This system, particularly wall 2, is, when needed, provided with a heat insulating layer 3 made for example of aluminum foils. The area 4 is provided for the service personnel to have access to the various parts of the nuclear reactor housed in building 1. Reference numeral 5 designates a biological shield preferably made of concrete. This shielding is provided to protect the service personnel operating in and from area 4, from any radioactive material escaping from the reactor system.

There is a space 8 between shielding 5 and insulating layer 3 or container 2, respectively. According to the present invention the inner surface of shield 5 and the outer surface of insulating layer 3 or container 2, respectively, are provided with neutron absorbing coatings 6 and 7, respectively. These coatings 6 and 7 are comprised, for example of boron, cadmium, gadolinium or compounds or alloys of these elements. Such alloys may include additionally the usual material used for the construction, such as stainless steel or the like. One of these alloys which has been found suitable to a high degree as neutron absorber is, for example, a silver-cadmium alloy. Other alloys or mixtures are also known, as boral or borglass.

As modification of the embodiment illustrated it is quite possible to additionally incorporate such neutron absorbing mtaerial into the heating insulating layer 3. It is furthermore possible to omit the layer 7 and to provide the heat insulating layer 3 with a sufficient percentage of neutron absorbing material.

FIGURE 2 illustrates this schematically, and layer 73 is to be a neutron-absorbing-heat-insulating layer of the character described.

If the heat insulating layer contains a neutron absorbing material, for instance, an alloy of 71% by weight Ag, 10% Cd and 18% In, a combined effect of heat insulation and neutron absorption can be achieved. To provide for such a bieffective insulation, an insulation is preferably used consisting of foils of this alloy with a total thickness of about 10 centimeters and with an effective thickness of the absorber material of approximately two millimeters.

The space 8 between heat insulation 3 and shield 5, or more specifically, between the coatings 6 and 7, contains gas, for example air, under a pressure below atmospheric pressure. The coatings 6 and 7 and eventually a neutron absorbing component of layer 3 absorbs most of the thermal neutrons which leave the pressure system; also, neutrons produced by moderation in the biological shield and diffusing back into the space 8 are absorbed. The provisions according to the invention effectively reduce the radioactivity in the space 8, and therefore, the content thereof now may readily be discharged into the atmosphere without requiring additional precautions.

The invention is not limited to the embodiment described above but all changes and modifications thereof not constituting departures from the spirit and scope of the invention are intended to be covered by the following claims:

We claim:

1. A shielding arrangement for a nuclear reactor comprising a reactor container, a biological shield spaced from and enclosing said container and defining together with said container a space wherein gas is maintained at a pressure less than atmospheric and from which the gas is discharged into the outer atmosphere, the improvement comprising; said biological shield having an inner surface comprising a neutron absorbing layer, and said reactor container having an outer surface multiple layer comprising a first inner heat insulating layer and a second outer neutron absorbing layer, whereby said space is bounded by neutron absorbing layers and the gas from said space may be discharged into the atmosphere with safety.

2. A protective arrangement for nuclear reactors, comprising a reactor container, a biological shield spaced from enclosing said container and defining together with said container a space wherein gas is maintained at a pressure less than atmospheric and from which the gas is discharged into the outer atmosphere, the improvement comprising; said reactor container having an outer surface comprising an inner heat insulating layer and an outer neutron absorbing layer and said biological shield having an inner surface comprising a neutron absorbing layer, whereby said space is bounded by neutron absorbing layers and the gas from said space may be discharged into the atmosphere with safety.

3. The protective arrangement of claim 2, said insulating layer including neutron absorbing components.

4. A protective arrangement for nuclear reactors, comprising a reactor container, a biological shield spaced from and enclosing said container and defining together with said container a space wherein gas is maintained at a pressure less than atmospheric and from which the gas is discharged into the outer atmosphere, the improvement comprising; said reactor container having an outer surface comprising a combined heat insulating and neutron absorbing layer, and said biological shield having an inner surface comprising a neutron absorbing layer, whereby said space is bounded by neutron absorbing layers and the gas from said space may be discharged into the atmosphere with safety.

5. A protective arrangement for nuclear reactors comprising a reactor container, a biological shield spaced from and enclosing said container and defining together with said container a space wherein gas is maintained at a pressure less than atmospheric and from which the gas is discharged into the outer atmosphere, the improvement comprising; said reactor container having an outer surface comprising an inner heat insulating layer and an outer neutron absorbing layer, and said biological shield having an inner surface comprising a neutron absorbing layer, said neutron absorbing layers selected from the group of materials consisting of compounds and alloys of boron, cadmium, gadolinium, and mixtures thereof, whereby said space is bounded by neutron absorbing layers and the gas from said space may be discharged into the atmosphere with safety.

6. A protective arrangement for nuclear reactors, comprising a reactor container, a biological shield spaced from and enclosing said container and defining together with said container a space wherein gas is maintained at a pressure less than atmospheric and from which the gas is discharged into the outer atmosphere, the improvement comprising; said reactor container having an outer neutron absorbing surface layer comprising foils of an alloy comprising by weight 71% Ag, 10% Cd and 18% In, and said biological shield having an inner surface comprising an alloy comprising by weight 71% Ag, 10% Cd and 18% In, whereby said space is bounded by neutron absorbing layers and the gas from said space may be discharged into the atmosphere with safety.

References Cited by the Examiner

UNITED STATES PATENTS

| | | | |
|---|---|---|---|
| 2,796,529 | 6/1957 | Morrison | 176—40 X |
| 2,807,581 | 9/1957 | Fermi et al. | 176—44 |
| 2,807,727 | 9/1957 | Fermi et al. | 176—40 X |
| 2,863,815 | 12/1958 | Moore et al. | 176—77 |
| 2,928,779 | 3/1960 | Weils et al. | 176—65 |
| 3,008,891 | 11/1961 | Knights et al. | 176—40 |
| 3,016,463 | 1/1962 | Needham. | |
| 3,034,976 | 5/1962 | Fortescue et al. | 176—59 |
| 3,126,352 | 3/1964 | Blair et al. | 252—478 |

FOREIGN PATENTS

| | | |
|---|---|---|
| 1,126,932 | 8/1956 | France. |
| 1,059,123 | 6/1959 | Germany. |

OTHER REFERENCES

Anderson, Nuclear Science and Engineering: 4, 357–359, September 1958.

Amorosi et al., Proceedings of the Second International Conference on the Peaceful Uses of Atomic Energy, vol. 9, September 1958, pages 400–403.

Charpie et al., Proceedings of the Second International Conference on the Peaceful Uses of Atomic Energy, vol. 9, September 1958, page 122.

REUBEN EPSTEIN, *Primary Examiner.*

OSCAR R. VERTIZ, CARL D. QUARFORTH,
*Examiners.*

R. C. LYNE, *Assistant Examiner.*